(12) United States Patent
Lee et al.

(10) Patent No.: US 7,199,954 B2
(45) Date of Patent: Apr. 3, 2007

(54) METHOD, APPARATUS AND PROGRAM STORAGE DEVICE FOR DETERMINING SECTOR BLOCK SIZES USING EXISTING CONTROLLER SIGNALS

(75) Inventors: Yuan Xing Lee, San Jose, CA (US); Weining Zeng, Cupertino, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 628 days.

(21) Appl. No.: 10/619,742

(22) Filed: Jul. 15, 2003

(65) Prior Publication Data

US 2005/0013028 A1    Jan. 20, 2005

(51) Int. Cl.
*G11B 5/09* (2006.01)
(52) U.S. Cl. .................................... 360/39; 360/51
(58) Field of Classification Search ............ None
See application file for complete search history.

(56) References Cited

U.S. PATENT DOCUMENTS

| 5,664,056 A | 9/1997 | Akagiri |
|---|---|---|
| 5,721,791 A | 2/1998 | Maeda et al. |
| 6,084,735 A | 7/2000 | Kawada et al. |
| 6,084,739 A | 7/2000 | Assouad |
| 6,104,321 A | 8/2000 | Akagiri |
| 6,424,936 B1 | 7/2002 | Shen et al. |
| 6,449,689 B1 | 9/2002 | Corcoran et al. |
| 6,505,320 B1 * | 1/2003 | Turk et al. ............... 714/755 |
| 6,577,460 B1 * | 6/2003 | Hanson .................. 360/40 |
| 2003/0002191 A1 * | 1/2003 | Stanek et al. ........... 360/65 |
| 2003/0014708 A1 * | 1/2003 | Hanson .................. 714/758 |
| 2003/0067699 A1 * | 4/2003 | Thomson et al. ......... 360/46 |

FOREIGN PATENT DOCUMENTS

| JP | 01114179 A | 2/1989 |
|---|---|---|
| JP | 11272294 A | 8/1999 |

* cited by examiner

*Primary Examiner*—Andrea Wellington
*Assistant Examiner*—Varsha A. Kapadia
(74) *Attorney, Agent, or Firm*—David W. Lynch; Chambliss, Bahner & Stophel

(57) ABSTRACT

A method and apparatus for determining sector block sizes using existing controller signals has been disclosed. The invention detects a characteristic of a data channel gate signal indicating a length of data, determines the length of data based on the detection of the characteristic, and calculates the size of a last data block in the length of data based on the determined length.

32 Claims, 9 Drawing Sheets

METHOD, APPARATUS AND PROGRAM STORAGE DEVICE FOR DETERMINING SECTOR BLOCK SIZES USING EXISTING CONTROLLER SIGNALS

BACKGROUND OF THE INVENTION

1. Field of the Invention

This invention relates in general to storage systems, and more particularly to a method, apparatus and program storage device for determining sector block sizes using existing controller signals.

2. Description of Related Art

Magnetic recording is a key and invaluable segment of the information-processing industry. While the basic principles are one hundred years old for early tape devices, and over forty years old for magnetic hard disk drives, an influx of technical innovations continues to extend the storage capacity and performance of magnetic recording products. For hard disk drives, the areal density of written data bits on the magnetic medium has increased by a factor of more than two million since the first disk drive was applied to data storage. Areal density continues to grow due to improvements in magnet recording heads, media, drive electronics, and mechanics.

Data bits may be read from and written to data sectors on the magnetic medium by read/write heads. In turn, read and write signals are communicated to and from the read/write heads through a read/write recording channel. Storage controllers provide support for several different sizes of these data sectors. However, the actual sector sizes that a read/write channel supports are typically not multiples of codeword sizes (including cyclic redundancy code (CRC) bytes and error correction code (ECC) bytes), e.g., channel run-length-limited (RLL) codes. The "byte" here is a generic term for referring a group of bits. It may be, but is not limited to, a group of 8-bits. It could be a group of any number of bits such as 10-bits or 12-bits. The examples described herein may be applied to different sizes of the "byte". A codeword size is the number of user bits transferred (as opposed to channel bits which are encoded user bits) and the code rate (=m/n) of, for example an RLL code, describes the ratio of the user bits (m) to the encoded channel bits (n).

More specifically, a channel code rate of ½ means that twice as much information as the user data is written on a magnetic medium. For example, if a storage controller, such as a hard disk controller (HDC), provides a 612-byte data sector and 8 CRC bytes and 36 ECC bytes, the actual size of the sector is 656 bytes. If a 96/104 channel code rate is used (i.e., 96 user bits to 104 encoded channel bits), then the codeword size is 12 bytes (i.e., 96 user bits divided by 8 bits, assuming there are 8-bits in a byte in this case).

When the size of a last block of data does not equal the size of the codeword, a read/write channel may process the last data block in two ways. The first way is to pad additional bytes to the last data block to extend its length to match the codeword size. For example, the block size of the last block of data (R) may be calculated as a modulo of the sector size N and the codeword size L, denoted as MOD (N, L). If the sector size N is 556 bytes and a 96/104-channel code rate is used, then the size of the last data block is 4 bytes (i.e., R=MOD (556, 12)=4 bytes). Then, the number of pad bytes required to make the size of the last data block equal to the codeword size is eight (i.e., 12 bytes−4 bytes=8 bytes). The approach of padding bytes extends parity protection on the last data block, but reduces overall code rate efficiency thereby resulting in losses in storage track format efficiency.

The second approach to deal with a smaller last data block is not to pad bytes to the last data block, but to leave the last data block parity unprotected. This technique does not suffer from a loss of code rate efficiency. However, this technique does increase the error rate thereby reducing error rate performance (e.g., the order of magnitude of losses depends on raw soft error rates).

A better way of dealing with the last data block is to employ a scheme that allows parity protection on a variable block size instead of a fixed block size. For example, in the case of a 96/104-channel code rate, parity protection on the last data block may be accomplished on block sizes starting with, for example, the 4 bytes as calculated above and proceed in 2-byte increment. This approach requires no pad bytes and retains parity protection on the last data block, thus, gaining overall system performance. However, in order to implement this approach, a read/write channel needs to know the size of the last data block, a parameter not provided by the current read/write channel hardware.

Nevertheless, there are techniques for a read/write channel to determine the size of the last data block. One way is for the recording channel to provide an electrical contact point (pin) for the storage controller, using a signal on the pin to determine the size of the last data block. Another technique is for the recording channel to provide registers to store the information of the size of last data block. However, these techniques require modifications to the interface between the controller and the read/write channel.

It can be seen then that there is a need for a method, apparatus and program storage device for determining sector block sizes using existing controller signals.

SUMMARY OF THE INVENTION

To overcome the limitations in the prior art described above, and to overcome other limitations that will become apparent upon reading and understanding the present specification, the present invention discloses a method, apparatus and program storage device for determining sector block sizes using existing controller signals.

The present invention solves the above-described problems by determining block sizes of the last blocks of data sectors including split sectors that a read/write channel receives from or transmits to a storage controller without any modifications to the interface between the controller and the read/write channel. Further, an appropriate parity encoding/decoding on the last blocks of data may be applied without padding additional bytes thereby resulting in an improvement in error rates and savings in data rate efficiency.

A program storage device readable by a computer tangibly embodies one or more programs of instructions executable by the computer to perform a method for determining a size of a last data block processed in a storage system, wherein the method includes detecting a characteristic of a data channel gate signal indicating a length of data, determining the length of data based on the detection of the characteristic, and calculating a size of a last data block in the length of data based on the determined length.

In another embodiment of the present invention, a read/write channel device is provided. The read/write channel device includes a signal processor for detecting a characteristic of a data channel gate signal indicating a length of data, and a counter to determine the length of the data based on the detection of the characteristic and to calculate the size of a last data block in the length of data based on the determined length.

In another embodiment of the present invention, a storage system for determining sector block sizes using existing controller signals is provided. The storage system includes a storage medium for storing data thereon, the storage medium formatted for a predetermined sector length, a transducer, operatively coupled to the storage medium, for reading and writing data on the storage medium, and a read/write channel device for determining a size of a last data block, including a signal processor for detecting a characteristic of a data channel gate signal indicating a length of data, and a counter to determine the length of the data based on the detection of the characteristic and to calculate the size of the last data block in the length of data based on the determined length.

In another embodiment of the present invention, another storage system for determining the size of a last data block is provided. This storage system includes means for detecting a characteristic of a data channel gate signal indicating a length of data, means for determining the length of data based on the detection of the characteristic, and means for calculating the size of a last data block in the length of data based on the determined length.

In another embodiment of the present invention, a method of determining a size of a last data block processed in a storage system is provided. The method includes detecting a characteristic of a data channel gate signal indicating a length of data, determining the length of data based on the detection of the characteristic, and calculating a size of a last data block in the length of data based on the determined length.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides a method, apparatus and program storage device for determining sector block sizes using existing controller signals. Parity protection or any other operations may be added to variable block size data. A system determines block sizes of the last blocks of data sectors that a read/write channel receives from or transmits to a controller without any modifications to the current interface between controller and the read/write channel. An appropriate parity encoding/decoding on the last blocks of data or any other operations on the last blocks of data may be applied without padding additional bytes to provide an improvement in error rates and a savings in data rate efficiency.

Figure 1:
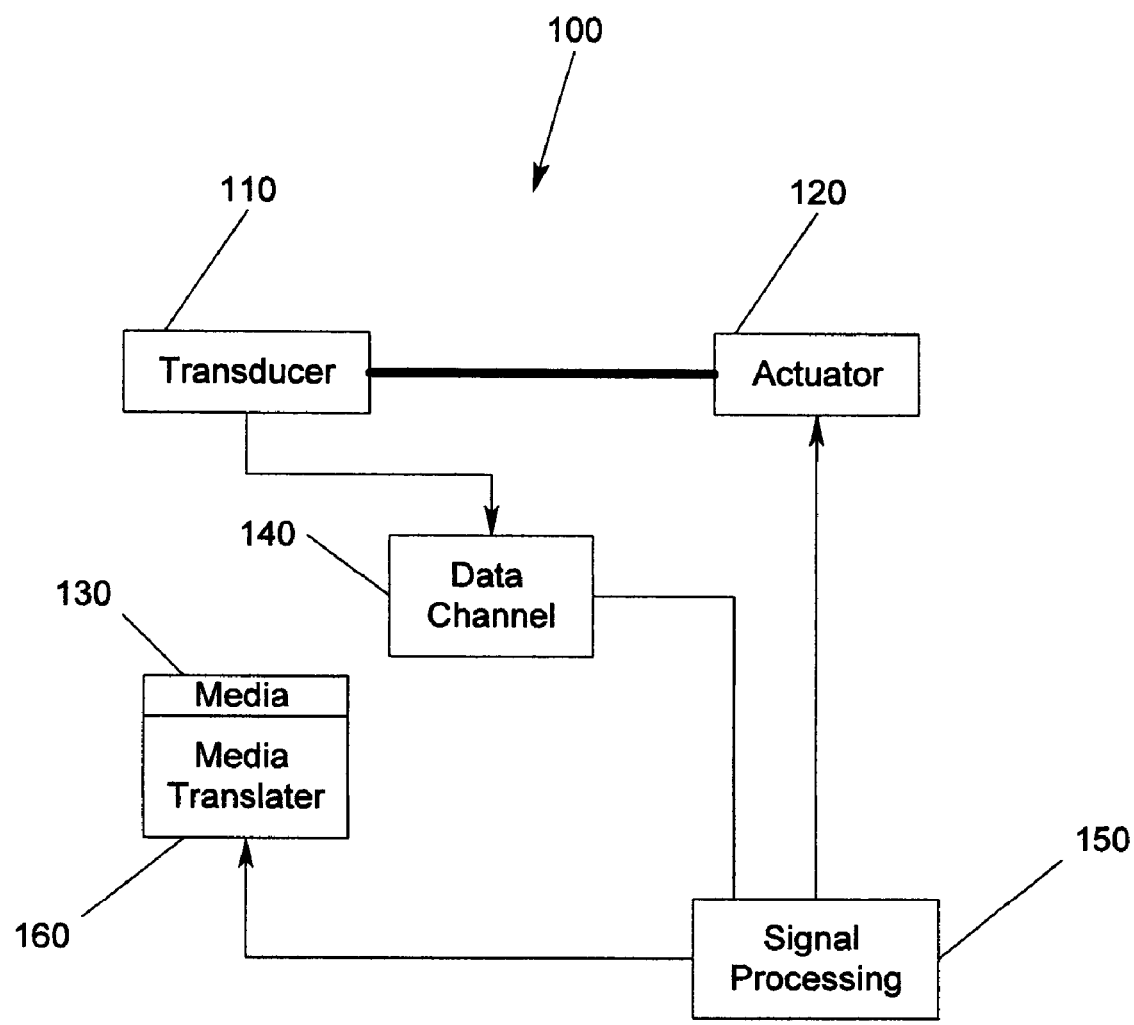
FIG. 1 illustrates a storage system.

FIG. 1 illustrates a storage system 100. In FIG. 1, a transducer 10 is under control of an actuator 120. The actuator 120 controls the position of the transducer 10. The transducer 110 writes and reads data on magnetic media 130. The read/write signals are passed to a data channel 140. A signal processor 150 controls the actuator 120 and processes the signals of the data channel 140. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
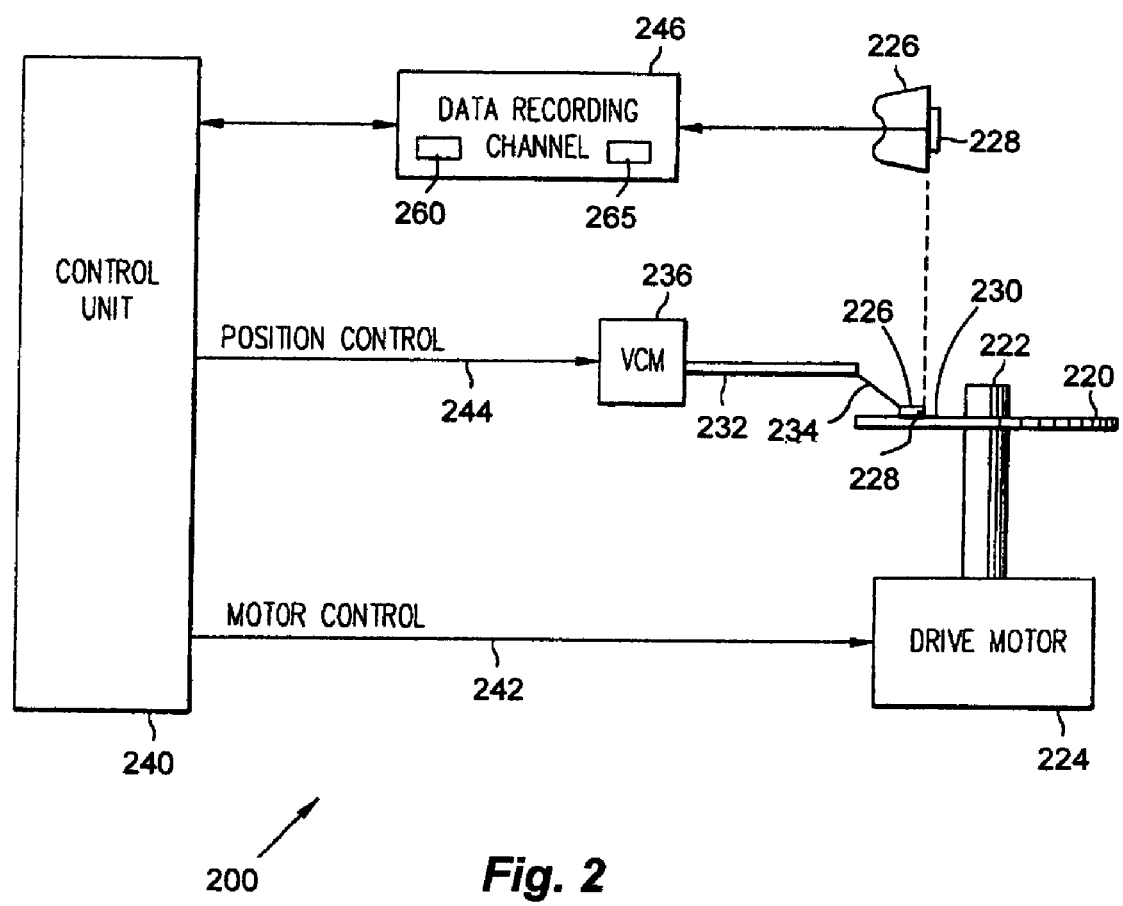
FIG. 2 is an illustration of one example of a magnetic disk drive storage system.

FIG. 2 is an illustration of one example of a magnetic disk drive storage system 200. As shown in FIG. 2, at least one rotatable magnetic disk 220 is supported on a spindle 222 and rotated by a disk drive motor 224. The magnetic recording media on each disk 220 is in the form of an annular pattern of concentric data tracks (not shown).

At least one slider 226 is positioned on the disk 220, each slider 226 supporting one or more magnetic read/write heads 228, wherein the heads 228 incorporate a sensor of the present invention. As the disk(s) 220 rotate, slider 226 is moved radially in and out over disk surface 230 so that the heads 228 may access different portions of the disk 220 wherein desired data is recorded. Each slider 226 is attached to an actuator arm 232 by means of a suspension 234. The suspension 234 provides a slight spring force, which biases the slider 226 against the disk surface 230. Each actuator arm 232 is attached to an actuator 236. The actuator 236 may be, for example, a voice coil motor (VCM). The actuator 236 is controlled by position control signals 244 supplied by a control unit 240.

During operation of the disk drive 200, the rotation of the disk 220 generates an air bearing between the slider 226 and the disk surface 230, which exerts an upward force or lift on the slider 226. The surface of the slider 226, which includes the heads 228 and faces the surface of disk 220 is referred to as an air-bearing surface (ABS). The air bearing thus counter-balances the slight spring force of suspension 234 and, during normal operation, supports the slider 226 proximate the disk surface 230 at a small, substantially constant spacing.

The various components of the disk drive 200 are controlled in operation by control signals generated by a control unit 240, such as access control signals and internal clock signals. Typically, control unit 240 has logic control circuits, storage apparatus, and a microprocessor. The control unit 240 generates control signals to control various system operations such as drive motor control signals 242 and head position control signals 244. The position control signals 244 provide the desired current profiles to optimally move and position the slider 226 to the desired data track on the disk 220.

Read and write signals are communicated to and from the read/write heads 228 through a recording channel 246. The recording channel may include devices, such as an encoder/decoder (ENDEC) and/or parity post-processor (PPP) 260 and counters 265.

The above description of a typical magnetic disk drive storage system 200 is for representation purposes only. It should be apparent that storage systems may contain a large number of disks and actuators, and that each actuator may support a number of sliders. Many other variations of the basic typical magnetic storage system 200 may be used in conjunction with the present invention while keeping within the scope and intention of the invention. However, those skilled in the art will recognized that the present invention is not meant to be limited to magnetic disk drive storage systems as illustrated in FIG. 2.

Figure 3:
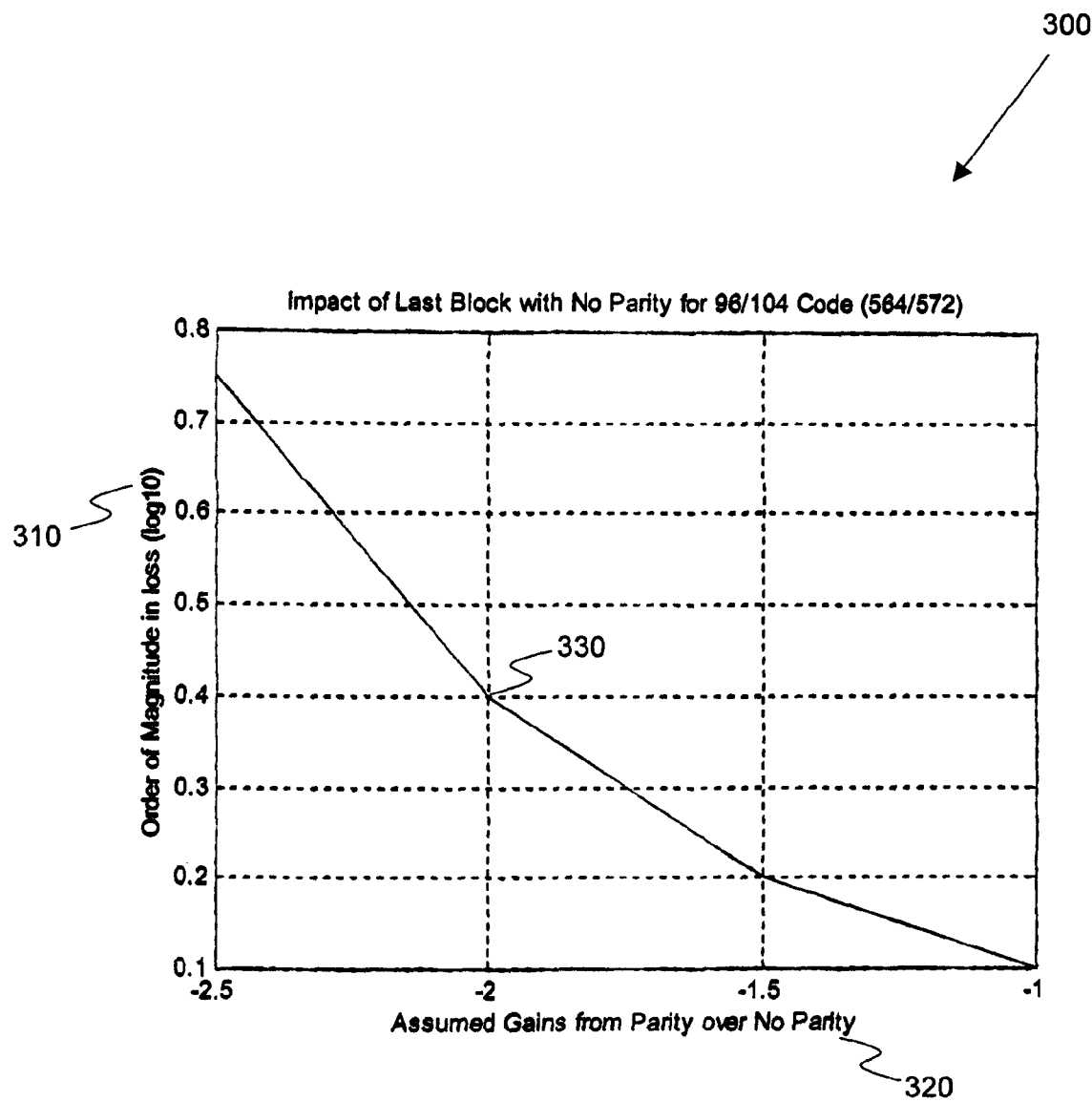
FIG. 3 illustrates a graph showing performance losses due to a lack of parity protection on a last data block having a size of eight bytes.
Figure 4:
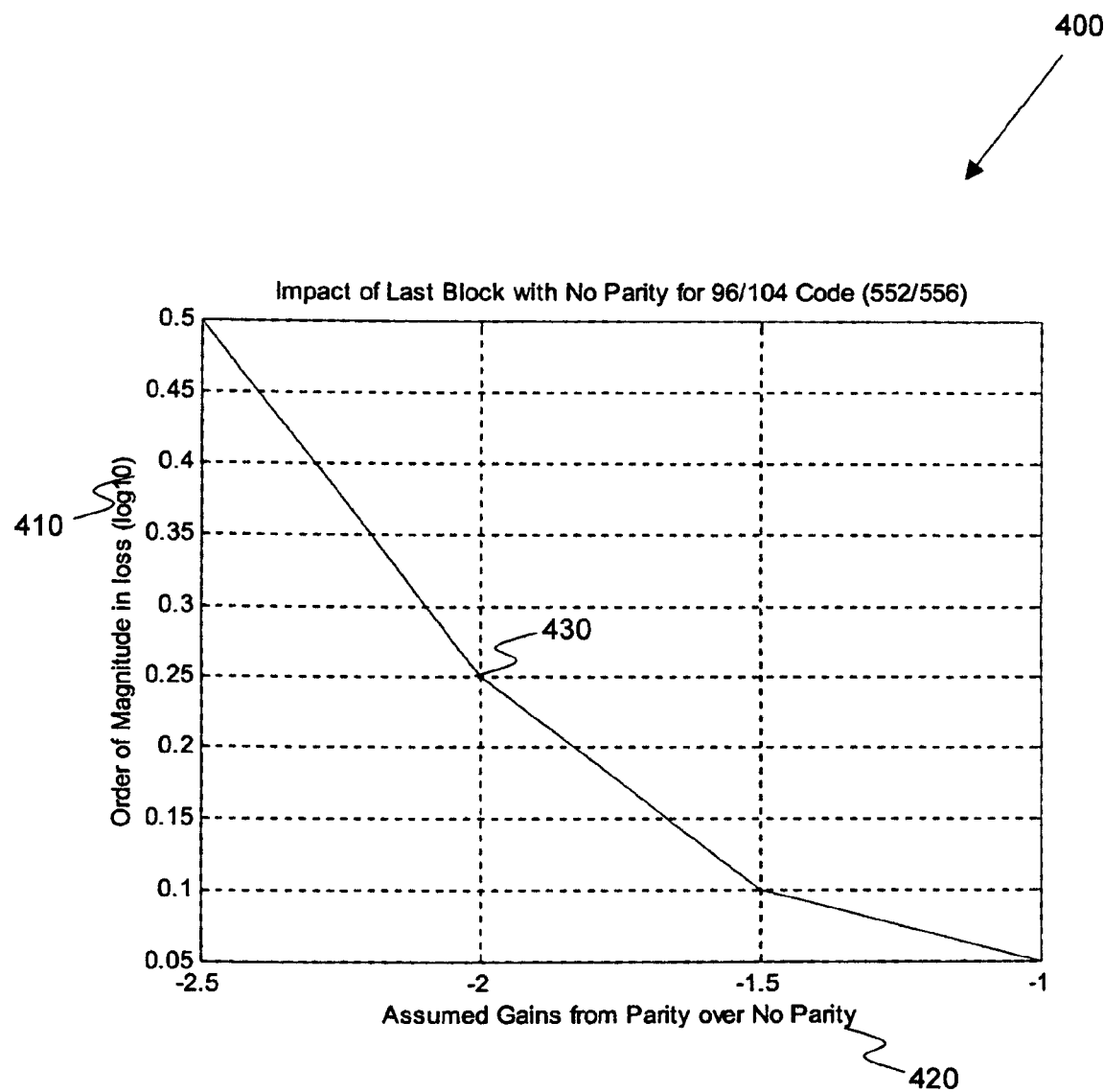
FIG. 4 illustrates a graph showing performance losses due to a lack of parity protection on a last data block having a size of four bytes.

FIGS. 3–4 are graphs 300, 400 illustrating losses in system performance due to a lack of parity protection. When dealing with a last data block that is smaller than the codeword, the read/write channel might leave the last data block parity unprotected and not pad bytes to the last data block. As mentioned above, this technique increases the error rate, reducing error rate performance (e.g., the order of magnitude of loss depending on raw soft error rates).

FIG. 3 illustrates a graph 300 showing performance losses due to a lack of parity protection on a last data block having a size of eight bytes. More specifically, FIG. 3 illustrates losses in performance due to the lack of parity protection on the last data block with respect to performance differences between parity code and non-parity code. This graph 300 assumes an actual sector size of 572 bytes (N), including CRC and ECC bytes, a codeword size (L) of 12 bytes, and the last data block size (R) equaling 8 bytes (e.g., R=MOD (N, L)=MOD (572, 12)=8 bytes). Hence, the bit error rate (BER) gain as illustrated in graph of FIG. 3 having the y-axis labeled as Order of Magnitude Losses (log10) 310 and the x-axis labeled as Assumed Gains from Parity over No Parity 320, is approximately a 0.4 order of magnitude loss 330 with the last data block having eight bytes.

FIG. 4 illustrates a graph 400 showing performance losses due to a lack of parity protection on a last data block having a size of four bytes. More specifically, FIG. 4 illustrates losses in performance due to the lack of parity protection on the last data block with respect to performance differences between parity code and non-parity code. This graph 400 assumes an actual sector size of 556 bytes (N), including CRC and ECC bytes, a codeword size (L) of 12 bytes, and the last data block size (R) equaling 4 bytes (e.g., R =MOD (N, L)=MOD (556, 12)=4 bytes). Hence, the bit error rate (BER) gain as illustrated in graph of FIG. 4 having the y-axis labeled as Order of Magnitude Losses (log10) 410 and the x-axis labeled as Assumed Gains from Parity over No Parity 420, is approximately a 0.25 order of magnitude loss 430 with the last data block having four bytes.

Accordingly, sector block sizes need to be determined using existing controller signals. With such support parity protection may be added to variable block size data. The present invention determines block sizes of the last blocks of data sectors that a read/write channel receives from or transmits to a controller without any modifications to the current interface between controller and the read/write channel. Appropriate parity encoding/decoding may be applied on the last blocks of data without padding additional bytes, thereby resulting in an improvement in error rates and savings in data rate efficiency.

Figure 5:
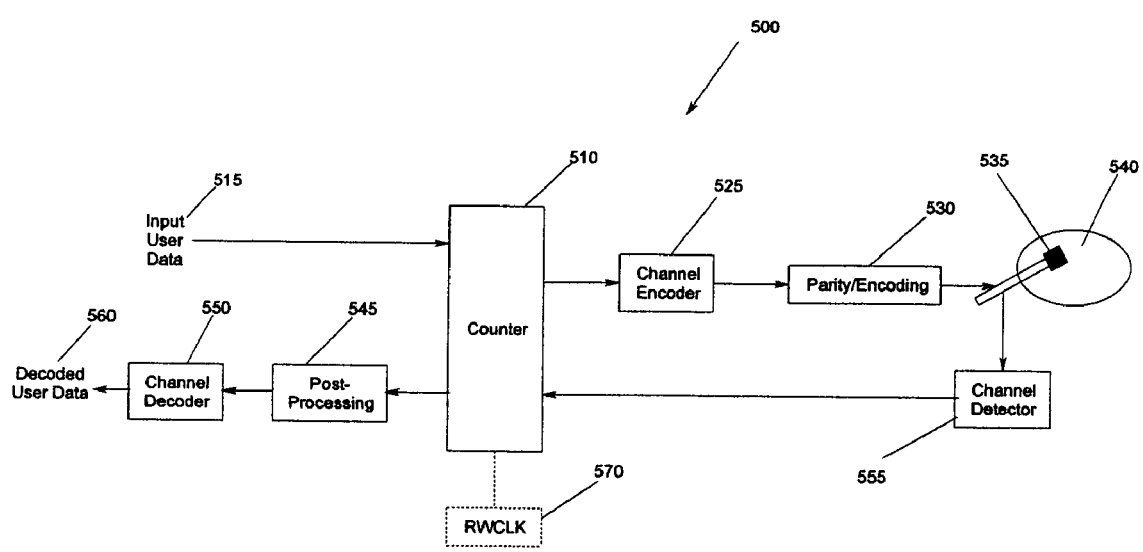
FIG. 5 illustrates a read/write channel according to one embodiment of the present invention.

FIG. 5 illustrates a read/write channel 500 according to one embodiment of the present invention. In order to calculate the size of the last block of user data, a read/write channel 500 needs to have a counter 510, such as a modulo counter, which is reset to zero each time the counter reaches a largest block size. When the counter 510 is stopped, the counter will calculate the size (R) of the last data block (i.e., remainder of bytes that when summed are smaller in size than that of a codeword).

When writing user information 515 to a medium 540, the counter 510 reports, among other things, the size of the last data block to a channel encoder 525. The channel encoder 525 will perform encoding on the user data 515 based on the sizes of the data blocks. Additional parity and/or encoding 530 may be performed on the last data blocks before being transmitted via a transducer 535 to the medium 540.

When reading data from sectors on a medium 540, parity post-processing 545 and decoding 550 are performed on the user data blocks. In order to apply parity post-processing 545 and decoding 550 on the last data blocks, the read/write channel 500 has to know, for example, the size of the last data block before the last data block enters the parity post-processor 545. Hence, the counter 510 reports, among other things, the size of the last data block (i.e., remainder of bytes for the last data block) via a channel detector 555 to the parity post-processor 545. After parity post-processing, the data is passed to channel decoder 550 for decoding. The channel decoder 550 generates decoded user data 560. The counter may be driven by a signal, such as an optional RWCLK 570. Those skilled in the art will recognize that the functions illustrated in FIG. 5 need not be performed by separate entities, but instead may be performed by a device properly configured, such as a digital signal processor (DSP) or an application specific integrated circuit (ASIC), etc.

Figure 6:
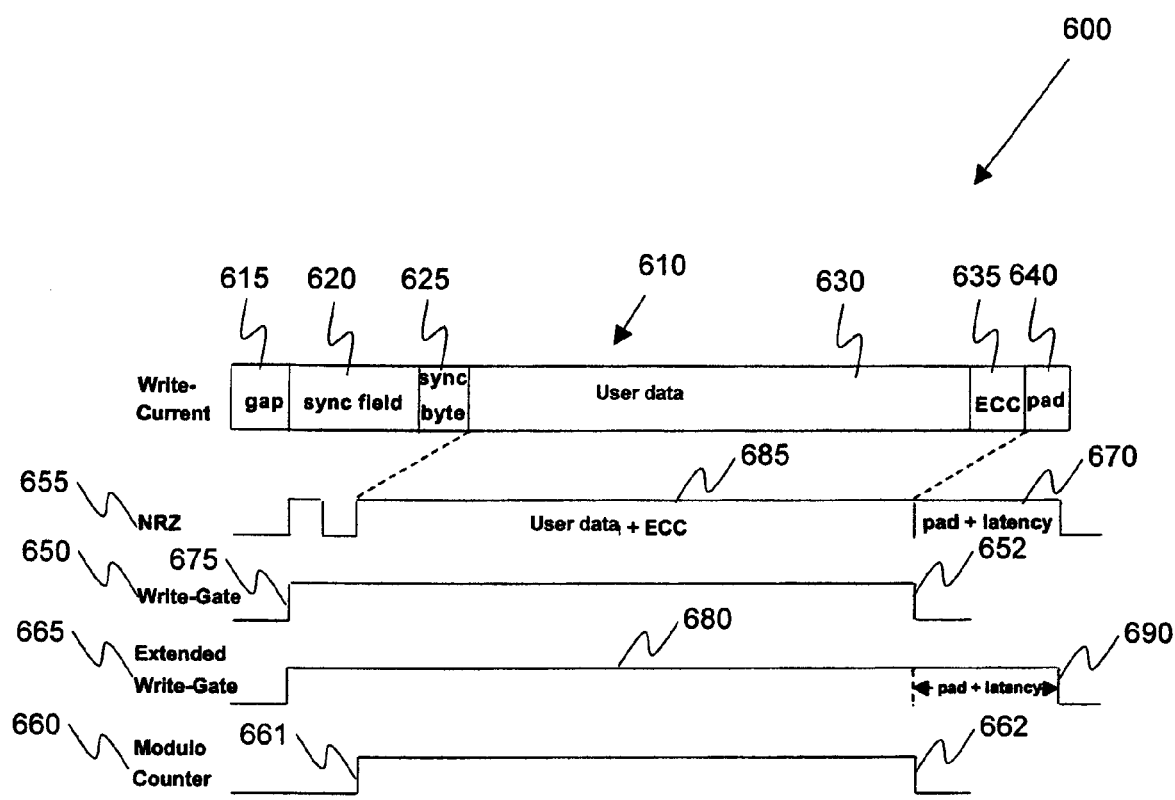
FIG. 6 is a timing diagram illustrating the transition of a storage controller write signal for determining sector block sizes according to one embodiment of the present invention.
Figure 7:
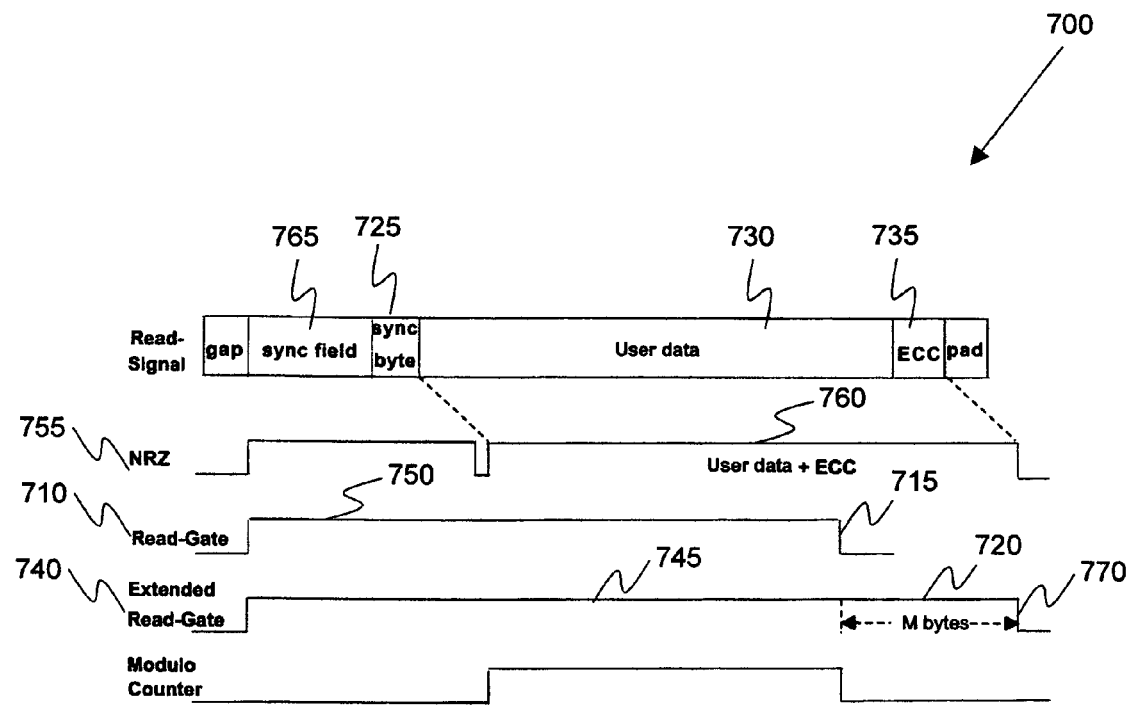
FIG. 7 is a timing diagram illustrating the transition of a storage controller read signal for determining sector block sizes according to one embodiment of the present invention.

FIGS. 6 and 7 illustrate signaling diagrams 600, 700 for determining sector block sizes using existing controller signals. According to the present invention, data 610 may be written to or read from a medium (220 in FIG. 2). The data 610 may include at least a gap field 615, a synchronization field (sync field) 620, synchronization bytes (sync bytes) 625, user data 630, error correction code 635 and pad bytes 640 (e.g., for Viterbi closure) However, the present invention is not meant to be limited to these fields.

A write signal (write-gate signal) 650 and/or a read signal (read-gate signal) provided from a storage controller (240 in FIG. 2), such as a HDC, may be used to indicate a length of the data being transmitted to the medium and is accurate with respect to a channel reference clock (RWCLK). The storage controller already has knowledge of the length of data sectors, including split sectors, by any acceptable manner. The storage controller indicates to the read/write channel the last byte of user data or any pre-defined number of bytes (M1 bytes for write gate signal and M2 bytes for read gate signal) before the last byte of user data by changing the characteristics of the write gate signal and/or read gate signal (e.g., de-assertion of the write gate signal and/or read gate signal). The M1 and M2 may be different and are programmable via a channel register. For write gate signal, the M1 is usually zero, which commands write gate signal to de-assert at the last byte of user data. M1 is not limited to zero, and could be any other number, which will command write gate signal to de-assert M1 bytes ahead of the last byte of user data. For read gate signal, M2 is usually non-zero, which commands read gate signal to de-assert M2 bytes ahead of the last byte of user data. The M2 is usually equal to the sum of the parity post-processor latency and the ENDEC latency.

The resolution of a trailing edge of the read and write signals generated by the storage controller is, for example, two (2) RWCLKs cycles, implying that the size of the last data block could be, for example, in two-byte increments. However, the present invention is not limited to the number of clock cycles or byte increments for the size of the last data block.

In order to calculate the size of the last block of a user data sector 610, a read/write channel (e.g., 500 in FIG. 5) may have a counter (510 in FIG. 5) that may hold a largest block size (i.e., the largest block size minus one byte for a counter numbering a first byte as zero). However, the present invention is not limited to this block size. This counter may be called the modulo counter, which is reset to zero each time the largest block size is reached. The counter may be driven by a clock, such as the RWCLK, and is triggered by the recognition of sync bytes 625. However, the present invention is not limited to driving the counter by a clock or triggering the counter by the recognition of sync bytes 625.

The largest block size L may be called the counter length. For example, let a data sector size (e.g., data sector size) be N bytes in length. When a 96/104-channel code is used, the largest block size L is 12 bytes (i.e., 96 user bits divided by 8 bits). The counter will provide a remainder (i.e., size (R)) as the size of the last block for the last data block after the counter is stopped. If the write gate signal de-asserts at the last byte of user data, wherein $$R = MOD(N, L). \quad (1)$$

If the write gate signal de-asserts M1 bytes ahead of the last byte of user data, and the counter has K bytes stored in the counter after stopping counting, then $$R = MOD(K + M1, L), \quad (2)$$

where K+M1=N.

For example, if N equals 556 bytes, and L equals 12, then R equals 4 (i.e., R=MOD (556, 12)=4) bytes.

Additionally, in order for read/write channel to properly write and/or read the last block of data having variable sizes, a processing device, such as an encoder/decoder (525, 550 in FIG. 5) and/or parity post-processor (PPP) (545 in FIG. 5), of the read/write channel must know the size of the last data block before the last data block arrives at read/write channel inputs, respectively. To determine the size of the last data block, transitions of storage control read/write signal is detected at specific timing intervals.

FIG. 6 is a timing diagram 600 illustrating the transition of a storage controller write signal for determining sector block sizes according to one embodiment of the present invention. For writing, a storage controller (240 in FIG. 2) de-asserts 652 the write-gate signal 650 upon detecting a last data byte excluding any pad bytes 640, appearing on a non-return-to-zero (NRZ) bus 655 (e.g., from the NRZ bus). However, the present invention is not limited to using NRZ channel bit representation, and is not limited to have storage controller de-asserts 652 the write-gate signal 650 upon detecting a last data byte. The storage controller may de-assert 652 the write-gate signal 650 M1 bytes ahead of the last data byte, where M1 is a pre-defined number between the storage controller and read/write channel. The de-assertion 652 of the write-gate signal 650 by the storage controller, signals the read/write channel (246 in FIG. 2) to the end of the last user data byte or M1 bytes ahead of the last data byte. The counter signal 660 transitions 662 and the counter then reports the size of the last data block to the processing device (525 in FIG. 5), which invokes proper encoders based on the size of the last block.

According to one embodiment of the present invention, due to write path latency, there will be sufficient time for the processing device (525 in FIG. 5) to encode/decode the last block of data after determining the last data block size. Accordingly, an extended write-gate signal 665 generated by either the storage controller or the read/write channel is active 680 (e.g., asserted) when write-gate signal 650 is active (e.g., asserted) and continues to be active until the last user byte and the all pad bytes for Viterbi closure 640 are flushed out of a read/write channel write path. The number of pad bytes may be a predefined number or one-bit of a register may be used to set this value.

The timing diagram of FIG. 6 also illustrates the signaling operation of a write process according to the present invention. A storage controller asserts the write-gate signal 650 and begins outputting data including a sync field 620, sync bytes 625, user data 630, and error correction code bytes 635. There are two modes to generate the pad bytes 640 (e.g., Viterbi closure pad bytes). One mode is that the storage controller generates the pad bytes 670 and encode pad bytes equal to a write path latency 671 (not actually get written onto the disk), and the read/write channel latches in the pad bytes 670. The second mode is that the read/write channel generates the pad bytes 640. When the read/write channel generates the pad bytes 640, the storage controller does not need to generates the pad bytes 670 and encode pad bytes equal to a write path latency 671.

The NRZ bus signal 655 transitions when the storage controller starts outputting sync bytes 625. Upon detection of a transition 685 of the NRZ bus signal 655 (e.g., assertion of the NRZ signal 655) by the read/write channel, the counter signal 660 is asserted 661 and the counter begins counting user data bytes 630 plus ECC 635. The read/write channel then latches in user data 630 and ECC 635 by any acceptable means. Upon the detection of de-assertion 652 of write-gate signal 650 by the read/write channel, the counter stops counting user data 630 (plus ECC 635) and reports the size of the remainder bytes (R) of a last data block to an encoder. The extended write-gate signal 665 continues to be active 680 (e.g., asserted) for as long as the read/write channel outputs encoded user data and pad bytes 640 (e.g., Viterbi closure pad bytes) to transducer.

The read/write channel will then perform parity and encoding on the last data block based on the size of the R bytes. The extended write-gate signal 665 will transition to an inactive state 690 (e.g., de-assert) upon detecting the last byte of Viterbi closure pad bytes 670 flushed out of the read/write channel write path.

For example, if sector size N=512+8+36=556, and the number of pad bytes 670 is 3, then if write-gate signal 650 will assert 675 for 556-bytes (i.e., N) after the sync word 625 starts on the NRZ bus 655. After the counter stops counting, the counter will have stored 4 bytes (i.e., R=MOD (556,12) =4 bytes) if 96/104-code is selected.

FIG. 7 is a timing diagram 700 illustrating the transition of a storage controller read signal for determining sector block sizes according to the present invention. In order to apply proper parity post-processing and decoding on a last data block, a read/write channel has to determine the size of last data block before the last data block enters the parity post-processor. To do this, the read-gate signal 710 has to be de-asserted 715 by the storage controller at least M2 bytes before the end of the last data byte of the sector being read, excluding any pad bytes, wherein M2 is equal to the sum of the parity post-processor latency and the encoder/decoder latency 720.

De-assertion 715 of the read-gate signal 710 at least M2 bytes before the end of the last data byte of the sector 720 is performed to make sure that the last data block has not been inputted into the parity post-processor yet (this is true for split and non-split sectors). In other words, the storage controller de-asserts 715 the read-gate signal 710 M2 bytes 720 before the end of the last data byte excluding any pad bytes to allow the read/write channel to determine the size of the last block before the last block is processed by the parity post-processor and the encoder/decoder.

A concern in determining the size of a last data block using the read signal is determining the value of M2. Since different parity post-processors and encoder/decoders may utilize blocks of different sizes, the values of M2 may be different for codes with different sizes. There are at least two solutions to this problem. A first solution is to make the value of M2 the same for all the codes having different sizes. A second solution is to select the largest code to be the value of M2. Accordingly, 1 or 2-bits of a register may be needed to set this value.

When reading user data from a sector on a medium, the counter (510 in FIG. 5) starts counting bytes upon a detection of sync bytes 725 by the read/write channel. The counter stops counting when the storage controller de-asserts 715 the read-gate signal 710 M2 bytes 720 before the end of a sector being read. At this point, the counter will have K bytes stored in the counter, wherein K+M2 equal the length of, for example, the user data 730 plus ECC bytes 735 for a sector. The counter reports the remainder of bytes (R) of the last data block to the parity post-processor and channel decoder, wherein $$R = MOD(K+M2, L) \quad (3)$$

The extended read-gate signal 740 generated by the read/write channel is active 745 when read-gate 710 is active 750 and continues to be active 745 until the last M2 data bytes 720 are flushed onto the NRZ bus 755.

The timing diagram of FIG. 7 also illustrates the signaling operation of a read process according to one embodiment of the present invention. The storage controller asserts 750 the read-gate signal 710 upon the detection of the beginning of a sync field 765. The NRZ bus 755 is asserted 760. Upon the detection of sync bytes 725, the read/write channel outputs one sync byte or several sync bytes onto NRZ bus 755 and begins to output additional user data 730 onto NRZ bus 755. The counter starts to count the user data bytes 730 while the storage controller latches the data by any appropriate means.

The storage controller then de-asserts 715 the read-gate signal 710 M2 bytes 720 before the end of the sector being read. Upon the de-assertion 715 of read-gate signal 710, the counter stops counting user data 730 and K bytes will have been stored in the counter. The counter then reports the size of the last data block (i.e., R bytes) to the parity post-processor and channel decoder, wherein the size of the last data block is equal to R=MOD (K+M2, L). The extended read-gate signal 740 continues to be active 745 (i.e., asserted) after read-gate signal 710 goes inactive 715 (i.e., de-asserted).

The processing of the last data block is determined as follows. If R is equal to zero, then the size of the last data block is L and the parity post-processor starts processing the last data block. If R is not equal to zero, then the size of a last data block is not L and the parity post-processor will process a current block of size L and also the last data block of size R. After parity post-processing, the data is passed to a channel decoder for decoding. Finally, the extended read-gate signal 740 goes inactive 770 upon the last byte of the data being flushed out of a channel read path.

Further, when reading user data, the read/write channel usually operates in an early-read-mode. Early-read-mode is the mode when a read/write channel de-asserts 715 a read-gate signal 710 earlier than the read/write channel should to allow for pipeline reading. Also, the storage controller typically has several bytes of latency in counting incoming user data bytes from the read/write channel. In order for the read/write channel to count bytes correctly, the storage controller needs to take the latency into account when de-asserting 715 the read-gate signal 710.

For example, if a sector size equals 556-bytes (i.e., N=512+8+36=556), the largest latency of the read-path is 30 bytes, and the delay of the storage controller counting data bytes is 2 bytes, then the read-gate signal will be asserted for M2 bytes (556 minus 30) after sync word 725 is detected. After the counter stops counting, the counter has stored 10 bytes (i.e., K=MOD (526, 12)=10 bytes) if 96/104-code is selected. Then the size R of the last data block is 4 bytes (i.e., R=MOD (10+30,12)=4). After finishing processing of the current 12-byte block, the parity post-processor selects parity post-processing for the 4-byte block.

Figure 8:
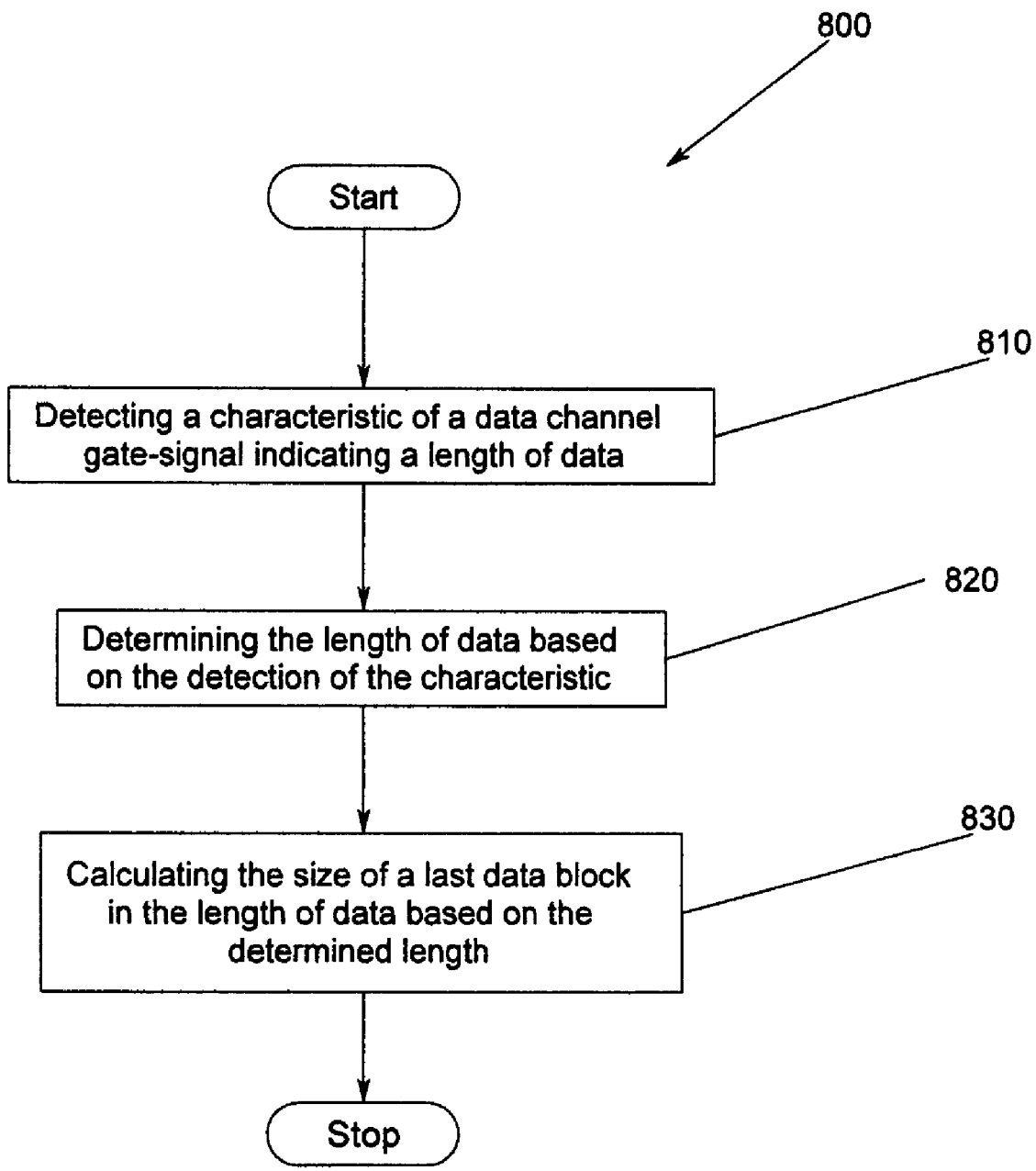
FIG. 8 is a flow chart for determining sector block sizes using existing controller signals.

FIG. 8 is a flow chart 800 for determining sector block sizes using existing controller signals according to the one embodiment of the present invention. In FIG. 8, a transition (e.g., assertion or de-assertion) of a data channel gate-signal is detected, indicating a length of data written to or read from a medium 810. The length of data is determined based on the detection of the transition of the gate-signal 820. Then, the size of a last data block in the length of data is calculated based on the determined length 830.

Figure 9:
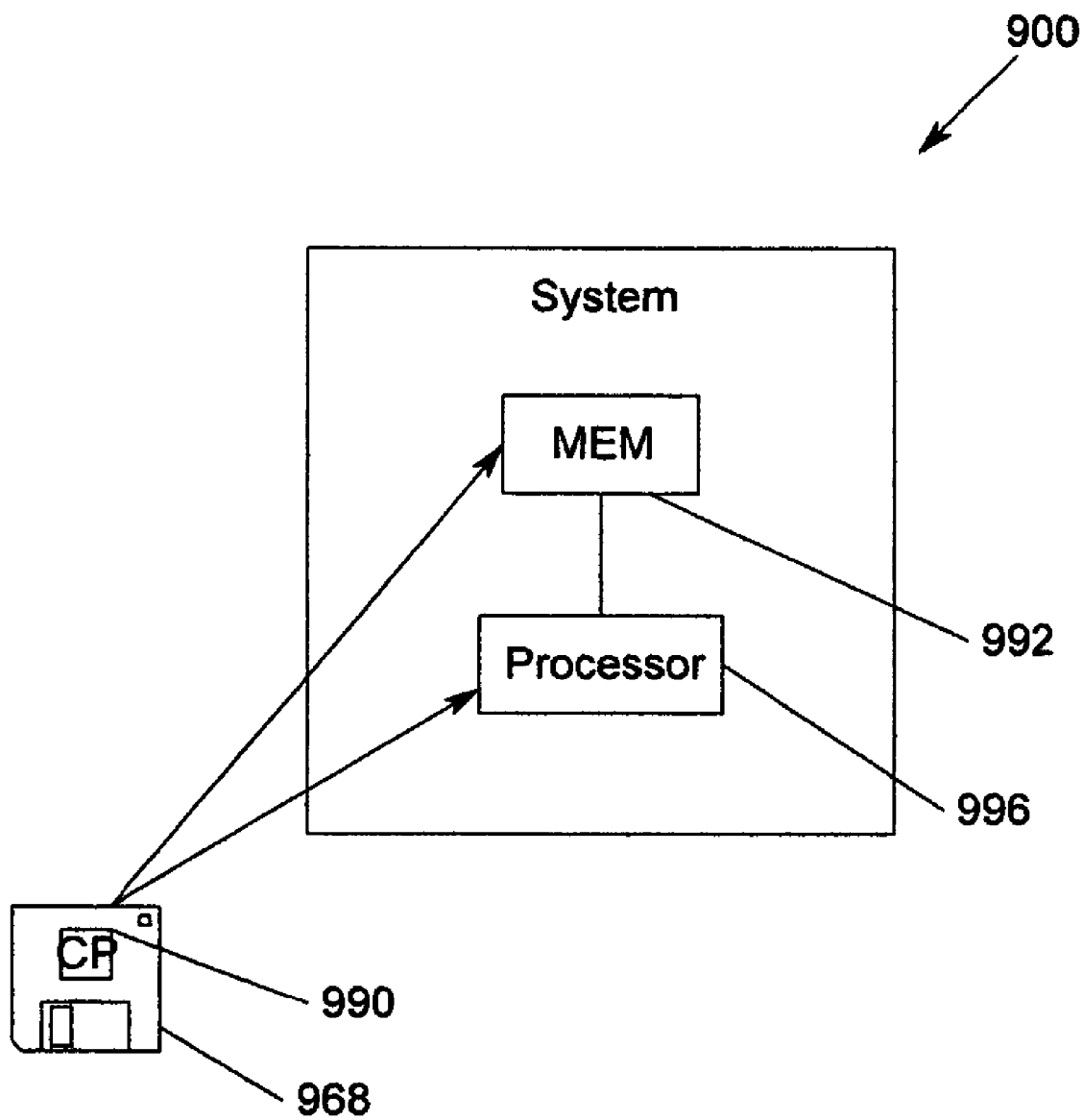
FIG. 9 illustrates a storage system that determines sector block sizes using existing controller signals according to one embodiment of the invention.

FIG. 9 illustrates a storage system 900 that determines sector block sizes using existing controller signals according to embodiments of the invention as illustrated with reference to FIGS. 1–8 using an executable program readable from a program storage device. The process illustrated with reference to the present invention may be tangibly embodied in a computer-readable medium or carrier, e.g. one or more of the fixed and/or removable data storage devices 968 illustrated in FIG. 9, or other data storage or data communications devices. A computer program 990 expressing the processes embodied on the removable data storage devices 968 may be loaded into the memory 992 or into the system 900, e.g., in a processor 996, to configure the system 900 of FIG. 9, for execution. The computer program 990 comprise instructions which, when read and executed by the controller 900 of FIG. 9, causes the system 900 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program storage device readable by a computer, the program storage device tangibly embodying one or more programs of instructions executable by the computer to perform a method for determining a size of a last data block processed in a storage system, the method comprising:
    detecting a data channel gate signal;
    initiating a counter for counting to a predetermined count upon detection of the gate signal;
    resetting the counter each time the predetermined count is reached;
    deasserting the gate signal a programmable length before the end of the last data byte;
    stopping the counter upon deassertion of the gate signal; and
    calculating a size of a last data block according to a remainder in the counter after the counter is stopped.

2. The program storage device of claim 1, wherein the detecting the characteristic of the data channel gate signal further comprises detecting a transition of a read-gate signal and a write-gate signal for indicating the last data block in the length of data.

3. The program storage device of claim 2, wherein the detecting the transition of the write-gate signal further comprises detecting a de-assertion of write-gate signal M1 bytes before the end of a data sector being written to provide the size of the last data block (R), the size of the last data block (R) equals MOD (K+M1 L), wherein K is a determined length count number, K+M1 equals the sector size N and L equals a codeword size.

4. The program storage device of claim 2, wherein the detecting the transition of the read-gate signal further comprises detecting a de-assertion of read-gate signal M2 bytes before the end of a data sector being read to provide the size of the last data block (R), the size of the last data block (R) equals MOD (K+M2, L), wherein K is a determined length count number, K+M2 equals the sector size N and L equals a codeword size.

5. The program storage device of claim 2 further comprising decoding the last data block after reading the last data block from a medium.

6. The program storage device of claim 5, wherein the decoding the last data block further comprises using parity post-processing and run-length-limited decoding schemes.

7. The program storage device of claim 1, wherein the calculating the size of a last data block further comprises calculating a modulo (MOD) of sector size (N) and codeword size (L) to provide the size of the last data block (R), wherein the size of the last data block (R) equals MOD (N, L).

8. The program storage device of claim 1 further comprising encoding the last data block before writing the last data block to a medium.

9. The program storage device of claim 8, wherein the encoding the last data block further comprises using parity and run-length-limited encoding schemes.

10. The program storage device of claim 1 further comprising applying parity encoding/decoding on the last data block without padding additional bytes.

11. A read/write channel device comprising:
    a signal processor for detecting a data channel gate signal the gate signal being deasserted a programmable length before the end of the last data byte; and
    a counter for counting to a predetermined count upon detection of the gate signal, the counter being reset each time the predetermined count is reached and stopped upon deassertion of the gate signal the counter providing a size of a last data block in the length of data according to a remainder in the counter after the counter is stopped.

12. The read/write channel device of claim 11, wherein the signal processor further comprises a read-gate and a write-gate for indicating the last data block in the length of data.

13. The read/write channel device of claim 12, wherein the write-gate provides a signal M1 bytes before the end of a data sector being written to provide the size of the last data block (R), the size of the last data block (R) equals MOD (K+M1, L), wherein K+M1 equals the sector size N and L equals a codeword size.

14. The read/write channel device of claim 12, wherein the read-gate provides a signal M2 bytes before the end of a data sector being read to provide the size of the last data block (R), the size of the last data block (R) equals MOD (K+M2, L), wherein K+M2 equals the sector size N and L equals a codeword size.

15. The read/write channel device of claim 11 further comprising a decoder for decoding the last data block after reading the last data block from a medium.

16. The read/write channel device of claim 15, wherein the decoder further comprises a post-processor for providing parity post-processing and a channel decoder for providing run-length-limited decoding schemes.

17. The read/write channel device of claim 11, wherein the counter calculates a modulo (MOD) of sector size (N) and codeword size (L) to provide the size of the last data block (R), wherein the size of the last data block (R) equals MOD (N,L).

18. The read/write channel device of claim 11 further comprising an encoder for encoding the last data block before writing the last data block to a medium.

19. The read/write channel device of claim 18, wherein the encoder further comprises a channel encoder and a parity encoder for providing parity and run-length-limited processing.

20. The read/write channel device of claim 11 further comprising an encoder/decoder for applying parity on the last data block without padding additional bytes.

21. A storage system for determining sector block sizes using existing controller signals, comprising:
    a storage medium for storing data thereon, the storage medium formatted for a predetermined sector length;
    a transducer, operatively coupled to the storage medium, for reading and writing data on the storage medium; and
    a read/write channel device for determining a size of a last data block, comprising
        a signal processor for detecting a data channel gate signal the gate signal being deasserted a programmable length before the end of the last data byte; and
        a counter for counting to a predetermined count upon detection of the gate signal, the counter being reset each time the predetermined count is reached and stopped upon deassertion of the gate signal; the counter providing a size of a last data block in the length of data according to a remainder in the counter after the counter is stopped.

22. The storage system of claim 21 further comprising a storage controller for generating both a write-gate signal and a read-gate signal to the read/write channel, and for generating NRZ data to read/write channel for writing and for receiving NRZ data from read/write channel for reading.

23. The storage system of claim 21, wherein the signal processor further comprises a write-gate and a read-gate for indicating the last data block in the length of data.

24. The storage system of claim 23, wherein the write-gate provides a signal M1 bytes before the end of a data sector being written to provide the size of the last data block (R), the size of the last data block (R) equals MOD (K+M1, L), wherein K+M1 equals the sector size and L equals a codeword size.

25. The storage system of claim 23, wherein the read-gate provides a signal M2 bytes before the end of a data sector being read to provide the size of the last data block (R), the size of the last data block (R) equals MOD (K+M2, L), wherein K+M2 equals the sector size and L equals a codeword size.

26. The storage system of claim 21 further comprising a decoder for decoding the last data block after reading the last data block from a medium.

27. The storage system of claim 26, wherein the decoder further comprises a post-processor for providing parity post-processing and a channel decoder for providing run-length-limited decoding schemes.

28. The storage system of claim 21, wherein the counter calculates a modulo (MOD) of sector size (N) and codeword size (L) to provide the size of the last data block (R), wherein the size of the last data block (R) equals MOD (N, L).

29. The storage system of claim 21 further comprising an encoder for encoding the last data block before writing the last data block to a medium.

30. The storage system of claim 29, wherein the encoder further comprises a channel encoder and a parity encoder for providing parity and run-length-limited processing.

31. A means for determining the size of a last data block processed in a storage system comprising:

means for detecting a data channel gate signal;

means for initiating a counter for counting to a predetermined count upon detection of the gate signal;

means for resetting the counter each time the predetermined count is reached;

means for deasserting the gate signal a programmable length before the end of the last data byte;

means for stopping the counter upon deassertion of the gate signal; and means for calculating a size of a last data block according to a remainder in the counter after the counter is stopped.

32. A method of determining a size of a last data block processed in a storage system comprising:

detecting a data channel gate signal;

initiating a counter for counting to a predetermined count upon detection of the gate signal;

resetting the counter each time the predetermined count is reached;

deasserting the gate signal a programmable length before the end of the last data byte;

stopping the counter upon deassertion of the gate signal; and calculating a size of a last data block according to a remainder in the counter after the counter is stopped.

* * * * *